United States Patent Office 3,516,991
Patented June 23, 1970

---

3,516,991
CHEMICAL PROCESS
Bradford H. Walker, Kalamazoo, Mich., assignor to The Upjohn Company, Kalamazoo, Mich., a corporation of Delaware
No Drawing. Filed Sept. 19, 1968, Ser. No. 760,986
Int. Cl. C07c *167/20*
U.S. Cl. 260—239.5                    3 Claims

ABSTRACT OF THE DISCLOSURE

A 3-enol ether or enamine of 4-androstene-3,17-dione, 4,9(11)-androstadiene - 3,17 - dione or 11β - hydroxy-androst-4-ene-3,17 - dione is alkylated with an organometallic reagent such as alkyl magnesium halide or alkyl lithium reagent to produce the corresponding 17α-alkyl-17β-hydroxyl compound by an improved process. The reaction is first induced to proceed to a point of stalling. A lower alkanol, followed by organometallic reagent, is then added to induce the reaction to proceed further. The steps of adding alkanol and organometallic reagent can be repeated until the unconverted 17-ketone reaches a desired minimum.

BRIEF SUMMARY OF THE INVENTION

The compounds 4-androstene - 3,17 - dione, 4,9(11)-androstadiene-3,17-dione and 11β-hydroxy-androst-4-ene-3,17 dione are intermediates in the preparation of valuable products such as 17α-methyltestosterone, 9α-fluoro-11β-hydroxy-17α-methyltestosterone and 9α - fluoro-11-keto-17α-methyltestosterone, by processes involving 17-alkylation with reagents of the organometallic type, e.g., methyl magnesium bromide or methyl lithium.

This invention relates to a process by which these intermediates can be 17-alkylated with increased yields.

As an example of the prior art, reference is made to the disclosure in U.S. Pat. 2,793,218 showing the reaction of 3-pyrrolidyl enamine of 4,9(11)-androstadiene-3,17-dione with methyl magnesium bromide to produce 9,11-dehydro-17-methyltestosterone. The reaction is carried out in an inert solvent such as tetrahydrofuran under reflux for several hours. The reaction mixture is then treated with alkali, and the desired product recovered from the reaction mixture.

Despite long reflux periods, the conversion to desired product is only about 50–75% of the theoretical, and the recovery of unreacted starting material from the mixture is difficult and expensive.

When the 3-keto group is protected by conversion to 3-enol ether, the same phenomenon of stalling occurs, and the same kind of difficulties in recovering unreacted 17-ketone prevail.

This propensity for the reaction to stall in these conversions has added materially to the cost of important pharmaceutical compounds such as 17α-methyltestosterone, 9α-fluoro-11β-hydroxy - 17α - methyltestosterone and 9α-fluoro-11-keto-17α-methyltestosterone.

According to the invention, it has been discovered that the stalling of this conversion reaction can be overcome simply and inexpensively by adding to the reaction mixture upon stalling, a quantity of methanol or other lower alkanol, followed by an additional quantity of organometallic reagent. The effect of the added methanol is apparently to revive the reaction so that it proceeds substantially further toward complete conversion of the 17-keto compound upon the addition of more Grignard or alkyl lithium reagent.

The step of adding additional methanol followed by Grignard or alkyl lithium reagent can be repeated, according to the invention, as many times as desired, each repetition bringing the reaction substantially closer toward complete conversion to the desired product. As a practical matter, it has been found that two such cycles of addition of lower alkanol and organometallic reagent will bring the reaction near 95% or more total conversion.

The invention applies particularly to the 3-alkyl enol ether or enamine as starting material, and is applicable where the reaction is carried out in an inert organic solvent such as tetrahydrofuran, benzene, ether, or in a mixture of such inert organic solvents. It is also applicable to the use of any lower alkanol such as methanol, ethanol, isoproponal, t-butanol. Methanol is preferred in most cases because of facility in workup.

DETAILED DESCRIPTION

The process of the invention is carried out conveniently by dissolving the 3-enol ether or enamine of 4-androstene-3,17-dione, 11β - hydroxy-androst-4-ene - 3,17 - dione or 4,9(11)-androstadiene-3,17-dione in an inert organic solvent such as tetrahydrofuran and then adding a slight molar excess of alkyl Grignard reagent or alkyl lithium reagent. The reaction is permitted to proceed until equilibrium is reached whereupon sufficient methanol or other lower alkanol is added to react with all of organometallic reagent present plus a small excess. Subsequent additional organometallic reagent followed by lower alkanol can be added, depending on the degree of completion desired.

The cycle of methanol or other lower alkanol treatment followed by organometallic reagent is repeated until the determinable amounts of unreacted starting material reaches some arbitrary minimum based upon the requirements of the operator in balancing such factors as costs versus ultimate yield of desired product. I have found that a schedule of lower alkanol addition followed by organometallic reagent repeated two more times, for example, an original Grignard reaction followed by lower alkanol and a second Grignard followed by lower alkanol and a third Grignard, is sufficient to give an overall conversion to 17α-alkyl-17β-hydroxy product of the order of 90–95%.

The following preparations and examples illustrate the invention:

PREPARATION 1

*3-methyl enol ether of 4,9(11)-androstadiene-3,17-dione*

To 50 g. of 4,9(11)-androstadiene-3,17-dione dissolved in 250 ml. of dimethylformamide is added 1.5 g. of para-toluenesulfonic acid hydrate, 10 ml. of methanol and 250 ml. of acetone dimethyl acetal. The mixture is refluxed for two hours, and the clear yellow solution allowed to stand overnight. To the solution is added 250 ml. of saturated sodium bicarbonate solution. The mixture is stirred, and the resulting slurry added to 2 l. of ice and water, and the precipitated crystals recovered by filtration. The precipitated crystals, the desired 3-methyl enol ether of 4,9(11)-androstadiene-3,17-dione, can be purified by recrystallization if desired. The purified material has a M.P. of 151.5–158° C.; $[\alpha]_D$ of −98° [in chloroform containing 1% triethylamine] and an ultraviolet extinction coefficient ($\epsilon$=19,822 at 241 m$\mu$.).

In an analogous manner other lower alkyl ethers can be produced as for example, the ethyl, isopropyl, or tertiary butyl 3-enol ethers of 4,9(11)-androstadiene-3,17-dione by using the corresponding alkanol and acetal.

In a similar manner but using 4-androstene-3,17-dione, or the corresponding 11β-hydroxy compound as starting materials, there are produced the 3-enol ethers of 4-androstene-3,17-dione or the 11β-hydroxy compound, respectively.

PREPARATION 2

3-pyrrolidine enamine of 11β-hydroxy-androst-4-ene-3,17-dione

To a solution of 30 g. of 11β-hydroxy-androst-4-ene-3,17-dione in about 150 ml. of refluxing methanol is added 7.1 g. of pyrrolidine. The enamine slurry which resulted is cooled, filtered and the crystals washed with methanol to yield 28 g. of the desired enamine.

EXAMPLE 1

*Conversion of the 3-enol ether of 4,9(11)-androstadiene-3,17 - dione to 17β-hydroxy-17α-methyl-4,9(11)-androstadiene-3-one*

To 45 g. of the 3-methyl enol ether of 4,9(11)-androstadiene-3,17-dione (3-methoxyandrosta-3,5,9(11)-triene-17-one), in 525 ml. of benzene and 630 ml. of ether, is added 102 ml. of 2 molar methyl magnesium bromide in 50:50 tetrahydrofuranbenzene. The original conversion was 70% of complete reaction. At 30 minute intervals, at room temperature, at which time the reaction reaches substantial equilibrium in each case, the following amounts of reagents are added successively:

| Amount (ml.) | Reagent | Degree of com-reaction, percent |
|---|---|---|
| 7.7 | Methanol | |
| 123.5 | Methyl magnesium bromide | 90 |
| 10.35 | Methanol | |
| 155.5 | Methyl magnesium bromide | 96 |
| 18 | Methanol | |

After distillation of 1.0 liter of solvent, a solution of 675 ml. of 10% sulfuric acid is added, and the mixture agitated for 20 minutes at 30–35° C. The aqueous phase is withdrawn, re-extracted with benzene, and discarded. The benzene solutions are extracted with an aqueous solution of sodium bicarbonate and sodium chloride, and concentrated to dryness. The product, 9(11)-dehydro-17-methyltestosterone, is crystallized from aqueous methanol. There is obtained 43 g. of product, M.P. 161–165° C., [α]$_D$+55° (CHCl$_3$).

A 3-lower alkyl enol ether of 4-androstene-3,17-dione (3-lower-alkoxyandrosta-3,5-diene-17-one) can be used as starting material in the above example as can other 3-lower-alkoxy-androsta-3,5,9(11)-triene-17-ones to achieve conversions of 90–95% or more.

The reaction is applicable to the use of other alkyl magnesium halides such as ethyl magnesium bromide or propyl magnesium bromide for the insertion of the corresponding 17α-alkyl group in the desired products as well as the use of alkyl lithiums such as methyl lithium or ethyl lithium.

EXAMPLE 2

*Conversion of 3-pyrrolidyl enamine of 11β-hydroxy-androst - 4 - ene-3,17-dione to 11β,17β-dihydroxy-17α-methyl-androst-4-en-3-one*

To 7.1 g. of enamine in 100 ml. of benzene and 50 ml. of tetrahydrofuran at −20 to −10° C. is added 40 ml. of 1.67 N methyl lithium. The reaction mixture is stirred for 30 minutes at −20° C. after addition of the organometallic reagent. The mixture is allowed to warm to room temperature during 2.5 hours. Methanol (3 ml.) is added at less than 30° C. and the reaction mixture stirred for 30 minutes at 26° C., then cooled to −20° C., and 48 ml. of methyl lithium added and the reaction mixture stirred overnight at up to room temperature. To the cooled mixture is added 50 ml. of water, 35 ml. of acetic acid and 120 ml. of methanol. Concentrated sodium hydroxide (18 g. of pellets plus 25 ml. of water) is added. The temperature rises to 55° C. (pH 11). The solution is stirred for 30 minutes, cooled to room temperature and neutralized to pH 6 with acetic acid. The aqueous phase is separated, back washed twice with 50 ml. of benzene and discarded. The organic phases are washed with aqueous sodium bicarbonate and concentrated to dryness. The product is recrystallized from acetone to give 4.26 g., M.P. 209–213° C., [α]$_D$+130° (CHCl$_3$); UV λ$_{max}$. 242 mμ; ε 15,750.

I claim:

1. In a method for the production of 17α-alkyl-17β-hydroxy products by the reaction of an organometallic agent of the class consisting of alkyl magnesium halide and alkyl lithium reagents, and with the 3-alkyl enol ether or 3-enamine of a member of the group consisting of 4-androstene-3,17-dione, 4,9(11)-androstadiene-3,17-dione and 11β-hydroxy-androst-4-ene-3,17-dione, the improvement which comprises inducing the initial reaction to come to an equilibrium at a point substantially short of complete conversion, adding a lower alkanol to the reaction mixture, followed by additional alkyl magnesium halide, thus inducing the reaction to proceed to a further point of equilibrium and repeating the addition of lower alkanol and alkyl mangesium halide until a desired degree of total conversion is reached.

2. The method of claim 1 wherein the starting material of Example 1 is converted to the 3-methyl enol ether of 9(11)-dehydro-17-methyltestosterone by the reaction with methyl magnesium bromide.

3. The method of claim 1 wherein the starting material of Example 1 is converted to the 3-enamine of 11β-hydroxy-17α-methyltestosterone by reaction with methyl lithium.

No references cited.

ELBERT L. ROBERTS, Primary Examiner

U.S. Cl. X.R.
260—397.5